May 11, 1948.　　　R. E. JENKINS　　　2,441,150
STEADY REST
Filed Feb. 1, 1945　　　2 Sheets-Sheet 1
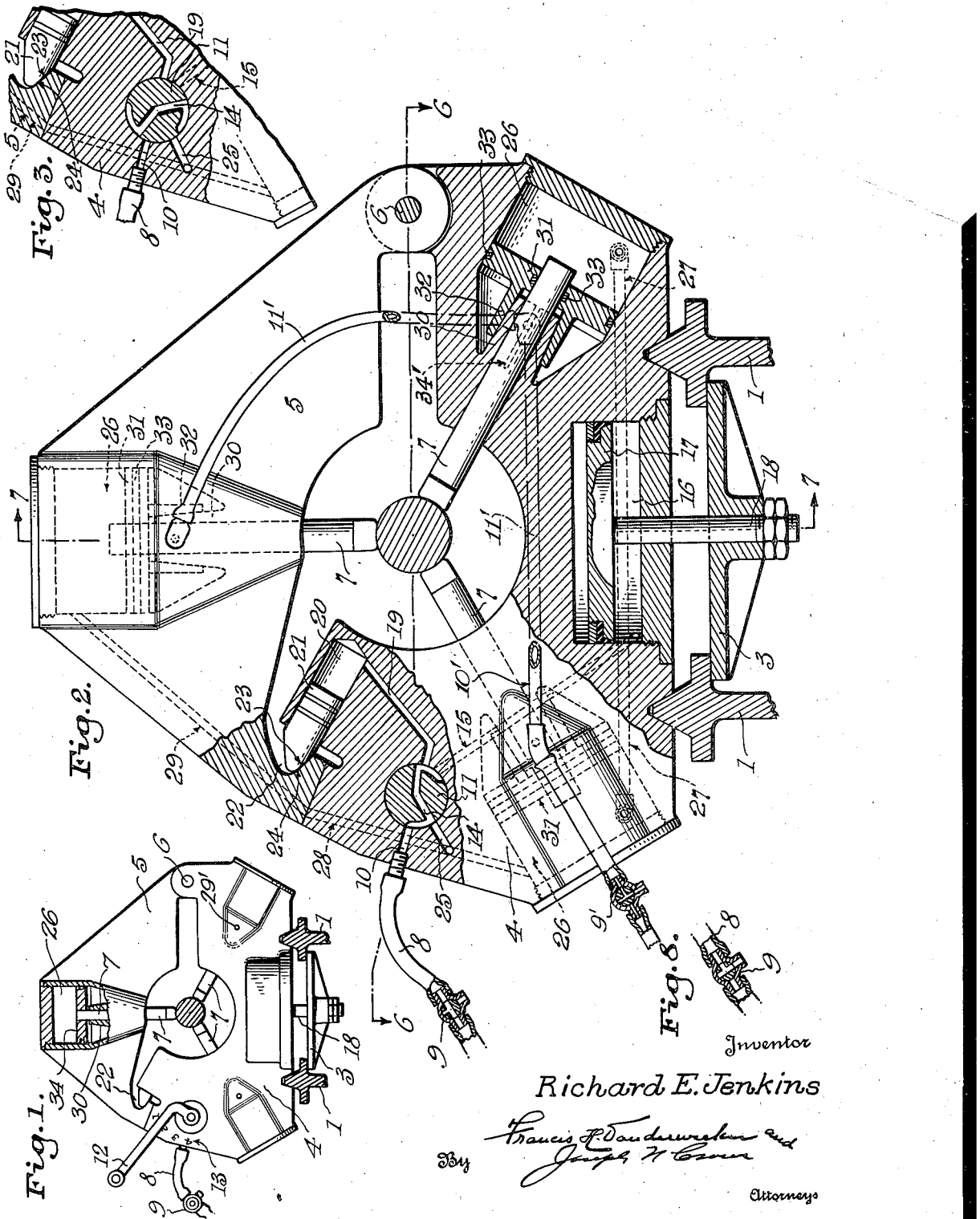
Inventor
Richard E. Jenkins

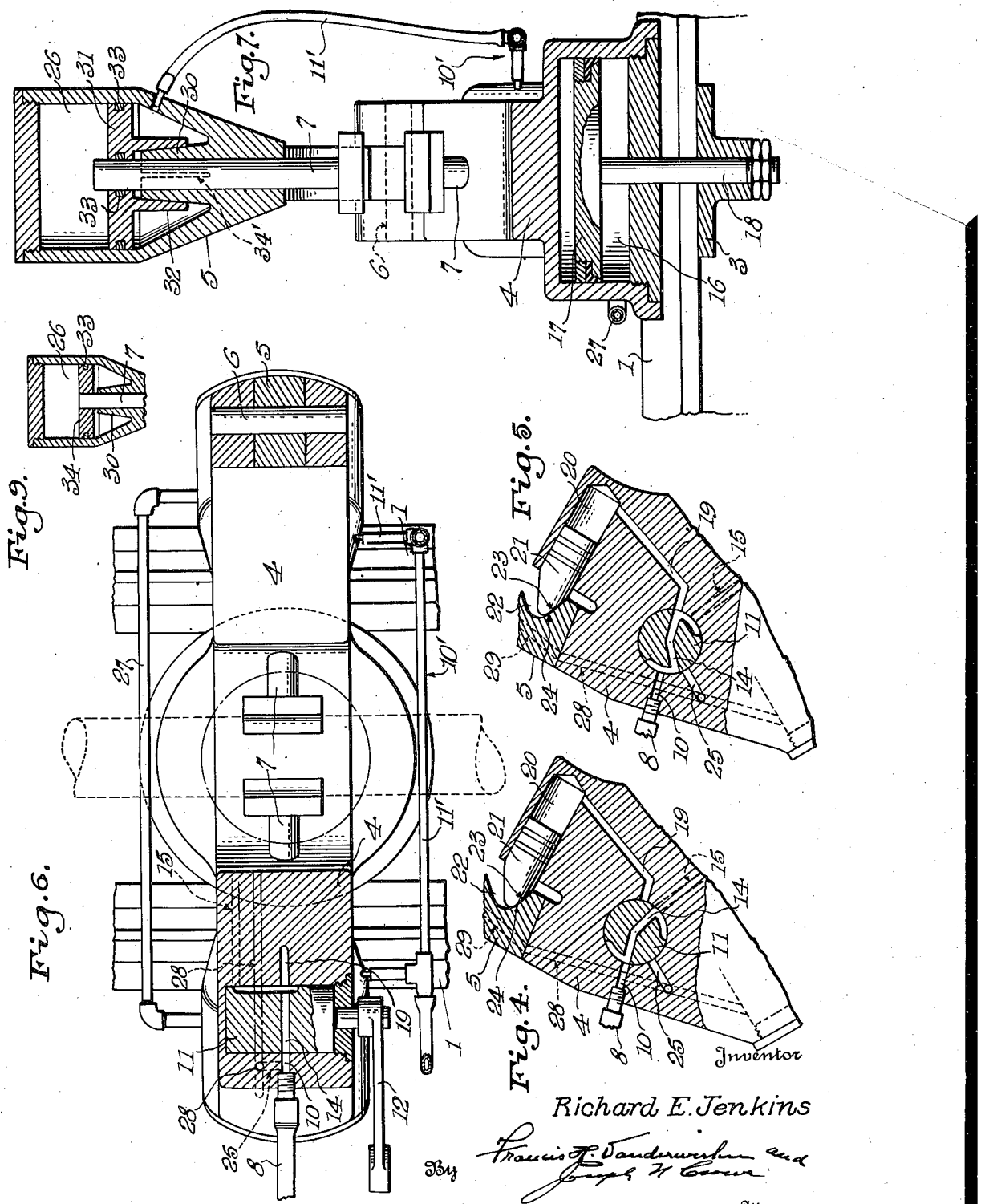

Patented May 11, 1948

2,441,150

UNITED STATES PATENT OFFICE 2,441,150

STEADY REST

Richard E. Jenkins, Keene, N. H.

Application February 1, 1945, Serial No. 575,720

5 Claims. (Cl. 82—39)

(Granted under the act of March 3, 1883, as amended April 30, 1928; 370 O. G. 757)

The invention described herein may be manufactured and used by or for the Government for governmental purposes, without payment to me of any royalty thereon.

This invention relates to steady rests, and more particularly it is directed to an automatic fluid pressure operated steady rest.

In the past it has been the practice in the art to clamp a steady rest to a lathe body by a manually operated clamping mechanism, wherein the hinged sections of the steady rest were manually clamped to provide a rigid condition, and also each of the adjustable centering pistons or holding jaws were manually operated individually. These manually operated clamp screws required considerable time in positioning and fastening the steady rest in operable position. The manually operated centering pistons or clamp jaws in addition to requiring considerable time in the proper placement were individually operated and controlled thus rendering it impossible to adjust each with equal pressure. The present invention overcomes each and all of the above enumerated disadvantages, in that the steady rest may be quickly clamped to a lathe body, the hinged members locked in operable condition, and the centering pistons positioned under equal pressure exerted by a constant pressure fluid system.

It is an object of this invention to provide a steady rest for a lathe which may be automatically clamped at a predetermined position on the lathe body.

Another object of this invention is to provide a steady rest formed of a pair of hinged members wherein the hinged members may be automatically locked in operable relationship.

A further object of this invention is to provide a steady rest having radially movable centering pistons wherein the centering pistons may be automatically positioned and caused to exert pressure on a structural member held therebetween.

A further object of this invention is to provide a steady rest wherein the same pressure is exerted on each of the centering pistons to position accurately a structural member supported therebetween.

Another object of this invention is to provide a device of the class herein described wherein all the centering pistons are positioned with the same pressure force and locked in this state.

A still further object of this invention is to provide a device of the class herein described which will be simple and economical in construction, and economical and durable in use.

The foregoing and other objects of this invention will be more apparent from reading the specification in conjunction with the drawings forming a part thereof, wherein:

Fig. 1 is a sectionized end elevation of the device in operable position illustrating an embodiment of the invention in which the piston and piston head are rigidly connected;

Fig. 2 is a detailed cross-sectional view of a modified form of the device parts being shown in elevation showing the rotary valve in full operable position;

Fig. 3 is a detail sectional view showing the rotary valve in shut-off position;

Fig. 4 is a detail sectional view showing the rotary valve connecting the pneumatic pressure source with the lathe clamping piston chamber conduit;

Fig. 5 is a detail sectional view showing the rotary valve operably connecting the pneumatic pressure source with the lathe clamping piston chamber conduit and the steady rest hinge clamping plunger chamber;

Fig. 6 is a horizontal sectional view taken along line 6—6 of Fig. 2;

Fig. 7 is a vertical sectional view taken along line 7—7 of Fig. 2;

Fig. 8 is a detailed section of the three-way valve; and

Fig. 9 is a sectional view of a centering piston of the type shown in Fig. 1.

In the drawings wherein like members are given the same reference numeral, lathe bed ways 1 support a steady rest positioned thereon in a manner such that it may be slidably moved longitudinally thereon and securely clamped in a predetermined position by a removable clamping member 3 as will be further discussed hereinafter.

The steady rest consists essentially of a base member 4 and a top member 5 pivotally connected at one end with a pivot bolt 6 and locked together at the other end by engaging cam surfaces, more fully discussed herein below. A plurality of pneumatically operated centering pistons 7 are positioned in the said base member 4 and top member 5, on equiangular lines with respect to the center point of the device.

A source of air under constant pressure is connected, through a three-way valve 9 positioned in a flexible tube 8, with a conduit 10 provided in the base member 4. This conduit 10 is connected through a four-position rotary valve 11 with the lathe clamping piston chamber, the steady rest hinge clamping plunger chamber and the centering piston chambers.

It is believed that the structural details of this invention will be more clearly understood by discussing the operation of the device with each position of the four-position rotary valve 11 operated by a handle 12 which when aligned with numerals 13 positioned on the base member 4 indicate the position of the valve. The valve 11 consists broadly of a substantially S-shaped conduit 14 connecting air pressure conduit 10 with various conduits leading to piston chambers or cylinders for selectively operating the individual pistons associated therewith.

The following discussion of the device presupposes that the three-way valve 9 is positioned to permit air under pressure to enter the conduit 10 leading to the rotary valve 11.

When the rotary valve 11 is in position 1, see Fig. 3, it is in the shut-off position as the S-shaped conduit is not registered with the air pressure conduit 10, or any of the other conduits for that matter.

When the valve is in position 2, see Fig. 4, the S-shaped conduit 14 is registering with the air pressure conduit 10 and the lathe clamping piston chamber conduit 15 permitting air under pressure to pass into the lathe clamping piston chamber 16 where it acts upon the air clamping piston head 17 moving the piston head upwardly and since the removable clamping member 3 is connected to the piston 18, it is urged into contact with the lathe bed ways 1 by the action of the piston head 17 moving upwardly.

When the valve operating handle 12 is in position 3, see Fig. 5, the air pressure conduit 10 is connected by the S-shaped conduit 14 with the lathe clamping piston chamber conduit 15 and the hinged clamping plunger conduit 19. The steady rest is held locked to the lathe while the air pressure is also directed to the hinge clamping piston chamber 20 where it forces the hinge locking plunger 21 into contact with the locking recess 22 provided in the top member 5. The hinge locking plunger 21 is provided with a cam surface 23, which engages the cam surface 24 of the locking recess 22 thereby urging the top member 5 into close contact with the base member 4 as the hinge locking plunger 21 is forced outwardly by the air pressure.

When the operating handle 12 is in position 4, see Fig. 2, the air pressure conduit 10 is connected by the S-shaped conduit 14 with the lathe clamping piston chamber conduit 15, the hinge clamping plunger chamber conduit 19 and the centering piston chamber conduit 25. The centering piston chamber conduit 25 is connected with one of the centering chambers 26 which is connected by a conduit 27 with the other centering piston chamber in the base member 4. A conduit 28 leading from the first-mentioned centering piston chamber terminates at the locking surface of the base member 4 and top member 5, and it is aligned with a conduit 29 provided in the hinge top member 5 connecting the source of pressure with the centering piston chamber 26 in said top member 5. It is considered advisable to mention at this time that the air pressure maintained in the connecting conduits 29 and 28 will escape at their joinder in the event of a failure in the hinge clamping means, and in this way operates as a safety indicator for the lathe operator.

Since each of the centering piston chambers 26 and the centering pistons 7 operate in the same manner, and are interconnected so that the pressure is equal in each, the discussion and illustration will be limited to one of these structures. It is one embodiment of this invention to provide a centering piston head 34 securely attached to the centering piston 7, see Fig. 9, which is actuated by pneumatic pressure to force the centering piston into contact under pressure with a structural member centered and supported by the plurality of centering pistons. An improvement over this piston arrangement, as shown in Figs. 2 and 7, will now be discussed in detail. The centering piston 7 is slidably mounted through a longitudinally slotted tubular extension 30 which is externally tapered. Surrounding the centering piston 7 is a piston plate 31 slidably mounted in the centering piston chamber 26 and also longitudinally movable along the centering piston 7. A tubular extension 32 extending from the plate 31 is internally tapered and surrounds the tubular extension 30. In this structure, the pneumatic pressure will force each of the centering pistons 7 into contact with a structural member centered and supported therebetween, and then force the plate 31 inwardly. As the plate 31 is forced inwardly the tubular extension 32 thereon will engage the external tapered extension 30 forcing the extension 32 into locking contact with the centering piston 7 due to the contraction afforded by the longitudinal slot 34' in the tubular extension 30, thereby locking the piston 7 against longitudinal movement. The tubular extension 30 has a longitudinal slot 34 provided therein. This slot 34 permits the tubular extension 30 to contract and expand in cross section upon the application and release of pressure.

On each and every longitudinally movable piston or plunger in a chamber, discussed above, there is provided a sealing ring 33 to prevent escape of the air under pressure. In this connection it is to be noted that in the construction shown in Fig. 1, air compressed by piston plate 31 as the latter moves inwardly is vented to atmosphere through opening 29'. In the construction disclosed in Fig. 2 air compressed by piston plate 31 as said plate moves inwardly is vented to atmosphere through conduits 11' and valve 9', as will be understood without further discussion.

In order to rapidly remove the pneumatic pressure from the system the three-way valve is turned to the bleeding position, see Fig. 8, thereby dissipating the pressure from each unit to the outside atmosphere depending upon the position of the four-position rotary valve; for instance, if the rotary valve is in position 4 and the three-way valve 9 in the pressure tube 8 is turned to the bleeder position, the pressure will be immediately removed from all chambers of the steady rest.

Assuming a steady rest construction embodying the piston and piston head assembly shown in Figs. 1 and 9, when the pneumatic system associated with the steady rest has been relieved of pressure, piston head 17 in lathe clamping chamber 16, together with piston 18 and clamping member 3, under the action of gravity, will move downwardly and, in so doing, will automatically release the steady rest from the lathe bed ways 1. Meanwhile, the top and base members 4 and 5, respectively, may be unlocked by inserting a suitable implement in locking recess 22 between the tip of locking plunger 21 and the opposing wall of recess 22. When in this position, manipulation of the implement will force the locking plunger 21 into its original position in the lower end of chamber 20. After members 4 and 5 have been unlocked, top member 5 may be swung upwardly and outwardly about pivot bolt 6, whereupon the work may be removed and the pistons 7 manually retracted to restore piston heads 31 to their initial positions.

In the event that the steady rest embodies a piston and piston head assembly as disclosed in the modifications shown in Figs. 2, 6 and 7, pistons 7 may be removed from the work and piston heads 31 restored to their original positions by means of an auxiliary pressure system 10' consisting of a three-way control valve 9' and distributing conduits 11' in communication with the conical portions of chambers 26 as shown in Figs. 2, 6 and 7. With this arrangement, sufficient pressure may be applied to the piston heads 31 to disengage the tubular extensions 30 and 32, retract pistons 7 and return piston heads 31 to their initial positions as will be understood without further discussion.

For clarity, the invention has been described employing a pneumatic pressure source, but it is to be clearly understood that any fluid pressure source, such as an oil hydraulic system, is operable.

Having thus described my invention, what I claim as new and wish to secure by Letters Patent is:

1. A steady rest comprising hinged body members, a plurality of chambers in said body members, slidable members mounted in said chambers, a camming recess in one of said body members adapted to receive one of said slidable members mounted in the other of said body members, a clamping member secured to another of said slidable members and adapted to engage the bed way of a lathe to securely fasten the steady rest thereto, the other of said slidable members being angularly spaced and adapted to engage a structural member therebetween, and means selectively directing fluid pressure to the aforementioned chambers for operably positioning said movable members positioned therein.

2. A steady rest comprising hinged body members, a piston slidably positioned in one of said body members, a clamping member secured to said piston and adapted to engage the bed way of a lathe, a plunger slidably mounted in one of said body members, a locking recess in the other of said body members and adapted to receive said plunger, a plurality of angularly spaced pistons slidably mounted in said body members and adapted to engage a structural member therebetween, a source of constant pressure fluid, and a multiple position valve selectively connecting said source of pressure with said slidably mounted members.

3. A steady rest comprising a base member adapted to slide along bed ways of a lathe, a fluid pressure actuated clamp mechanism provided in said base member and adapted to clamp the said base member to the aforementioned lathe bed ways, a top member pivotally connected to said base member, a locking recess provided in said top member, a fluid pressure actuated plunger provided in said base member and adapted to engage said locking recess, a plurality of angularly spaced fluid pressure actuated pistons provided in said base and top members, an external source of fluid pressure, and a multiple position valve selectively directing fluid pressure to said fluid pressure actuated members.

4. A steady rest comprising a base member, a top member pivotally connected to said base member, fluid pressure actuated means locking said top member to said base member, fluid pressure actuated means clamping said steady rest to a lathe, and a plurality of fluid pressure actuated pistons adapted to center and support a structural member therebetween, and means selectively directing fluid pressure to said piston and to said fluid pressure actuated means.

5. A steady rest comprising a base member, a top member pivotally connected to said base member fluid pressure actuated means locking said top member to said base member, fluid pressure actuated means clamping said steady rest to a lathe, and a plurality of fluid pressure actuated pistons adapted to center and support a structural member therebetween, and a multiple position valve selectively directing fluid pressure to said clamping means in one position and to said clamping means and to said locking means in another position and to all of the fluid pressure actuated members in another position.

RICHARD E. JENKINS.

REFERENCES CITED

The following references are of record in the file of this patent:

UNITED STATES PATENTS

| Number | Name | Date |
| --- | --- | --- |
| 1,961,091 | Smith | May 29, 1934 |
| 2,016,482 | Brown | Oct. 8, 1935 |

FOREIGN PATENTS

| Number | Country | Date |
| --- | --- | --- |
| 302,443 | Great Britain | Dec. 20, 1928 |